United States Patent [19]

Riordan et al.

[11] Patent Number: 4,471,202
[45] Date of Patent: Sep. 11, 1984

[54] DUAL BRAZING ALLOY WIRE FEEDER

[75] Inventors: Edward D. Riordan, S. Somerville; Raymond J. Mikolay, Parlin, both of N.J.

[73] Assignee: Joyal Products, Inc., Linden, N.J.

[21] Appl. No.: 409,368

[22] Filed: Aug. 19, 1982

[51] Int. Cl.³ .............................................. B23K 1/04
[52] U.S. Cl. .............................. 219/85 R; 219/85 G; 219/85 M; 219/56.22
[58] Field of Search .............. 219/85 R, 85 A, 85 BA, 219/85 BM, 85 F, 85 M, 56, 56.1, 56.22, 85 G; 310/207, 234; 228/179

[56] References Cited

U.S. PATENT DOCUMENTS

| | | | |
|---|---|---|---|
| 2,672,838 | 3/1954 | Heidenreich | 219/85 G X |
| 3,636,621 | 1/1972 | Dammer | 310/234 X |
| 3,919,576 | 11/1975 | Reinbeck et al. | 310/207 |

Primary Examiner—Roy N. Envall, Jr.
Assistant Examiner—Catherine M. Sigda
Attorney, Agent, or Firm—Lerner, David, Littenberg, Krumholz & Mentlik

[57] ABSTRACT

A method and apparatus for brazing a commutator to a pair of armature wires which are arranged one above the other employ a dual brazing alloy wire feeder which feeds one brazing alloy wire between a commutator and the lowermost armature wire, while simultaneously feeding the other brazing alloy wire between the lowermost armature wire and the uppermost armature wire. At the conclusion of the brazing operation, the partially consumed brazing alloy wires are automatically advanced to a predetermined length in preparation for a subsequent brazing operation by which the commutator is mechanically and electrically connected to another pair of armature wires.

18 Claims, 5 Drawing Figures

DUAL BRAZING ALLOY WIRE FEEDER

FIELD OF THE INVENTION

The present invention relates to a method and apparatus useful in the manufacture of electric motors. More particularly, the method and apparatus involve the simultaneous feeding of two or more brazing alloy wires during a brazing operation by which a plurality of armature wires are mechanically and electrically connected to a commutator of an electric motor.

BACKGROUND OF THE INVENTION

There are two known prior art techniques for brazing a commutator to a plurality of adjacent armature wires which are arranged one above the other. In one technique, a U-shaped clip is manually inserted onto the lowermost armature wire such that one leg of the clip is positioned between the lowermost armature wire and the armature wire directly above it, while the other leg of the clip is positioned between the lowermost armature wire and the commutator. Upon application of electrical current to the commutator and the armature wires, the clip melts. As the molten metal solidifies, the armature wires are mechanically and electrically connected to each other and to the commutator. Although the normal brazing alloy is a phosphorous and copper mixture, the clips must have a silver content in order to give them the rigidity necessary to assume and maintain their U-shape. Thus, this prior art technique has two primary disadvantages. First, the clips are expensive to manufacture, especially due to the pre-shaping process required to manufacture them and the need to employ silver as part of the brazing alloy. Second, the manual insertion of the clips is time consuming, thereby increasing the overall length of the brazing operation.

The other prior art technique involves feeding a single brazing alloy wire between two armature wires which are positioned in a slot formed in a riser of a commutator. This technique requires that the commutator be provided with a riser. The provision of a riser on the commutator is disadvantageous because it increases the manufacturing cost of the armature and, hence, the resulting electric motor.

SUMMARY OF THE INVENTION

The problems and disadvantages of the prior art techniques discussed above are overcome in accordance with the present invention by feeding a first brazing alloy wire between a commutator and a lowermost armature wire while simultaneously feeding a second brazing alloy wire between the lowermost armature wire and an armature wire directly above it. At the conclusion of the brazing operation, the partially consumed first and second brazing alloy wires are automatically retracted away from the commutator and the armature wires and then automatically advanced a predetermined distance in preparation for feeding in connection with a subsequent brazing operation by which the commutator is mechanically and electrically connected to at least two other armature wires.

In one embodiment, during the brazing operation, the first brazing alloy wire is resiliently and continuously urged between the commutator and the lowermost armature wire while the second brazing alloy wire is resiliently and continuously urged between the lowermost armature wire and the armature wire directly above it. At the conclusion of the brazing operation, a piston rod of a pneumatic cylinder automatically retracts the partially consumed first and second brazing alloy wires. In preparation for the subsequent brazing operation, a first set of rollers advances the first brazing alloy wire, while the second brazing alloy wire is advanced by a second set of rollers. The first brazing alloy wire passes freely through the second set of rollers as it is advanced by the first set of rollers. Similarly, the second brazing alloy wire passes freely through the first set of rollers as it is advanced by the second set of rollers. Thus, the first and second brazing alloy wires are fed and advanced simultaneously without interfering with each other and without unduly prolonging or extending the brazing operation.

BRIEF DESCRIPTION OF THE DRAWINGS

For a more complete understanding of the present invention, reference may be had to the accompanying detailed description of an exemplary embodiment considered in conjunction with the accompanying drawings in which.

DESCRIPTION OF THE EXEMPLARY EMBODIMENT

Figure 1:
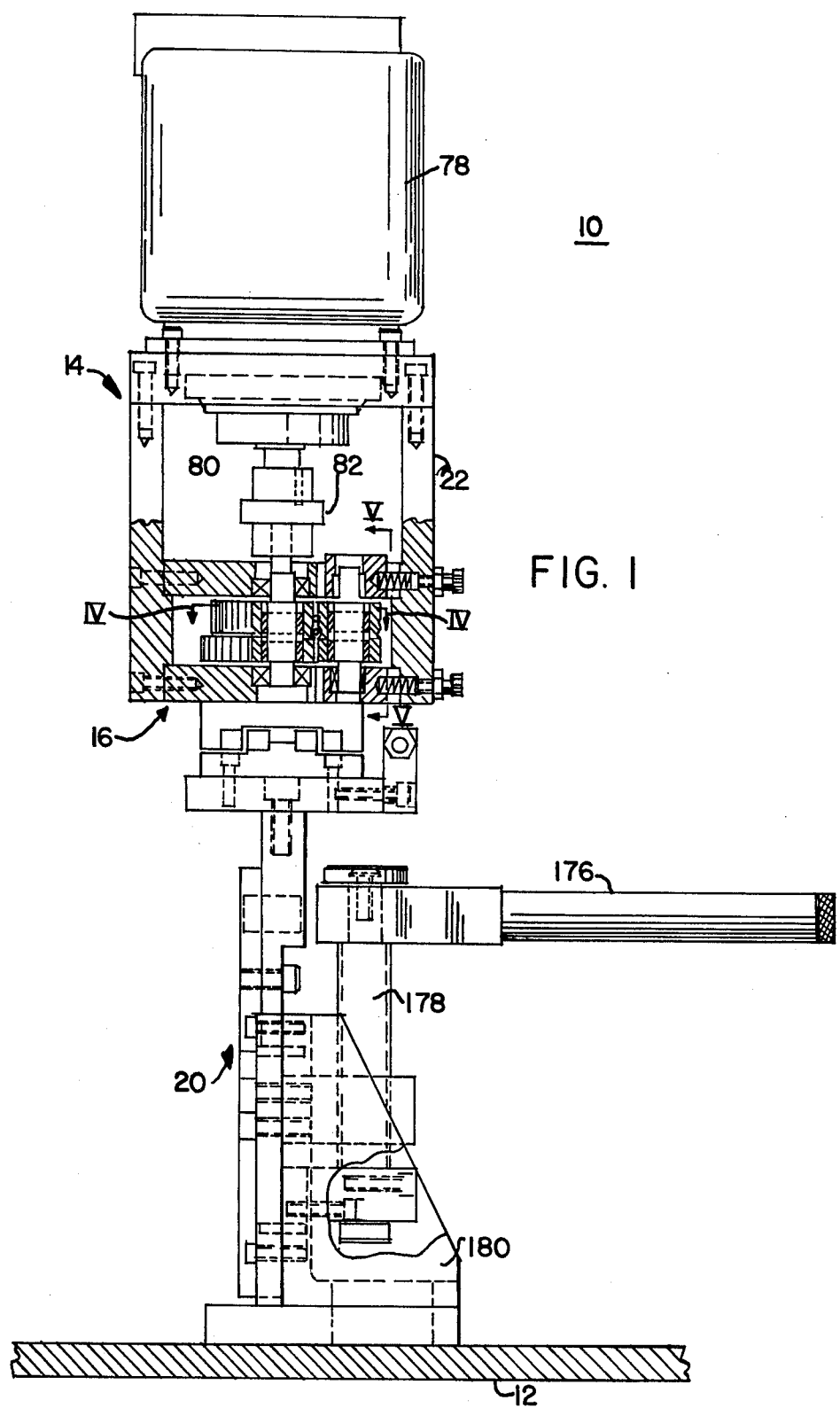
FIG. 1 is a front elevational view of an exemplary embodiment of a dual brazing alloy wire feeder constructed in accordance with the present invention, portions of the feeder being broken away to facilitate consideration and discussion.
Figure 2:
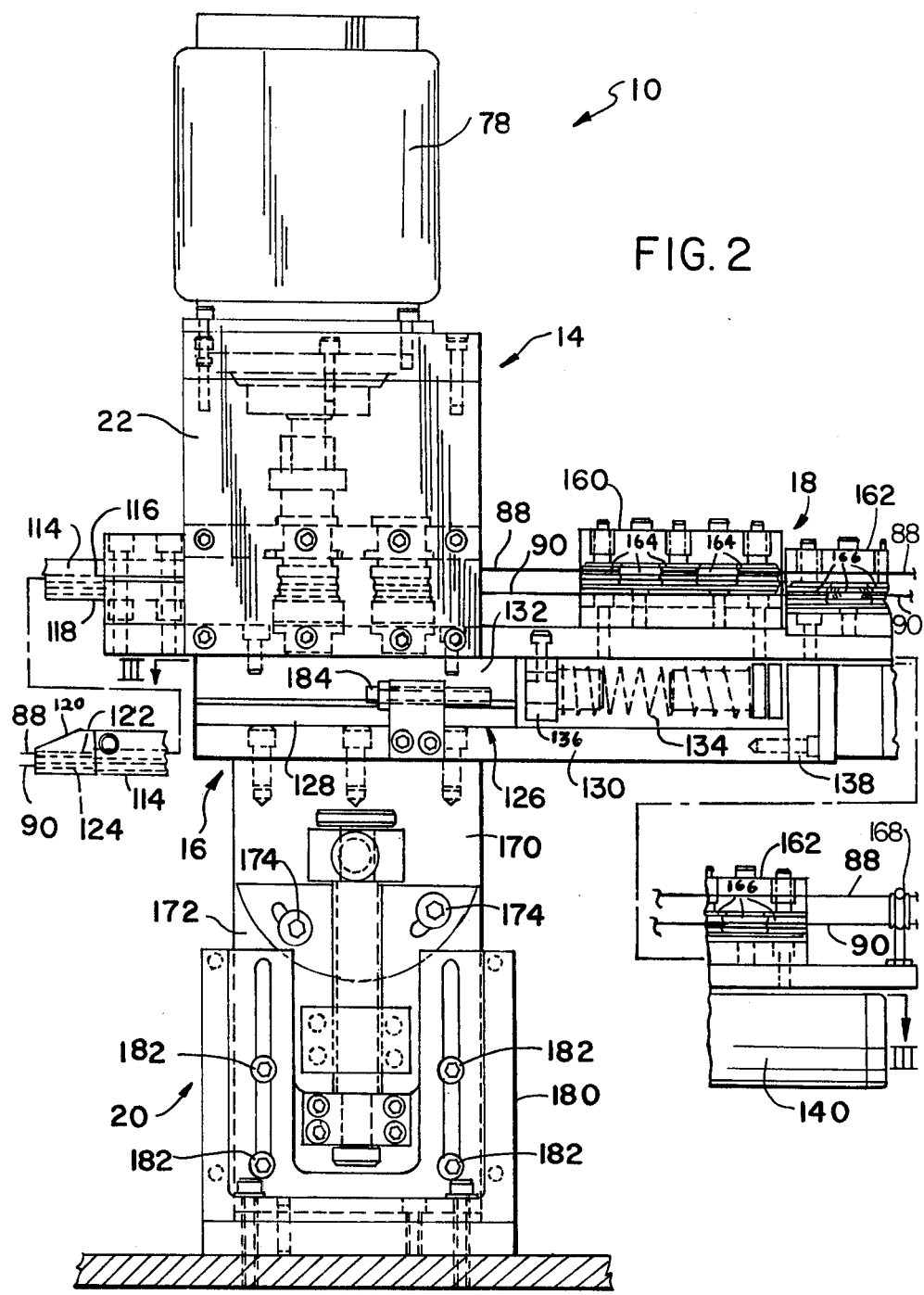
FIG. 2 is a right side elevational view of the dual brazing alloy wire feeder of FIG. 1.

Referring to FIGS. 1 and 2, there is shown a dual brazing alloy wire feeder 10 which is mounted on a frame member 12 of a brazing machine (not shown). The dual brazing alloy wire feeder 10 includes a wire feed assembly 14, a wire feed assembly drive unit 16, a wire straightener assembly 18, and a support assembly 20.

Figure 4:
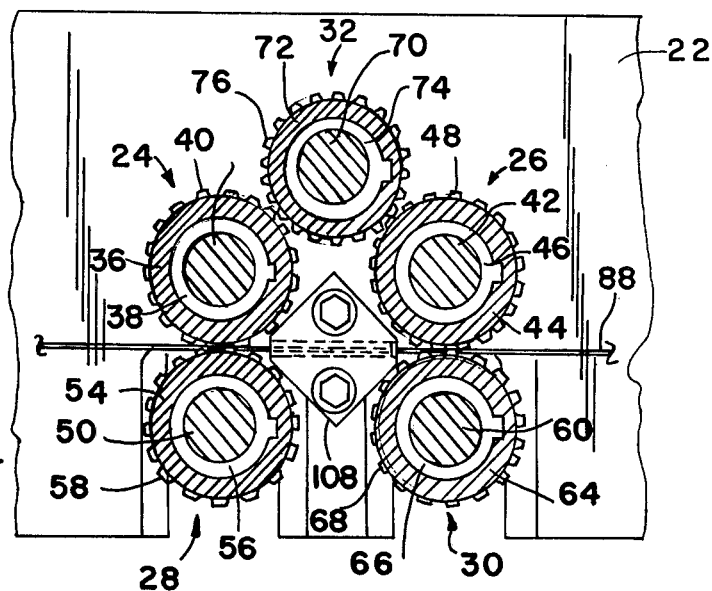
FIG. 4 is a cross-sectional view taken along line IV—IV in FIG. 1 and looking in the direction of the arrows.
Figure 5:
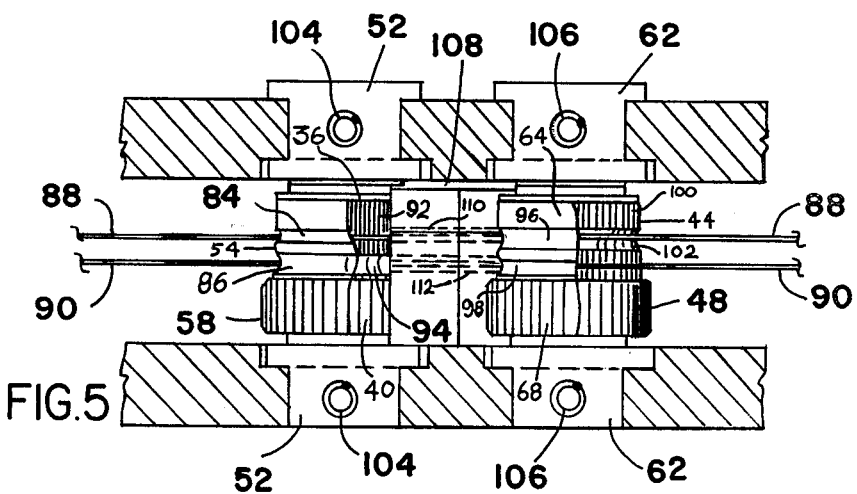
FIG. 5 is a cross-sectional view taken along line V—V in FIG. 1 and looking in the direction of the arrows, certain elements being broken away to facilitate consideration and discussion.

With particular reference to FIGS. 4 and 5, the wire feed assembly 14 includes a housing 22 which contains a front drive wheel unit 24, a rear drive wheel unit 26, a front feed wheel unit 28, a rear feed wheel unit 30, and a transfer wheel unit 32. The front drive wheel unit 24 includes a fixed shaft 34 which is rotatably mounted in the housing 22, a drive wheel 36 mounted for rotation with the shaft 34 by a keyed bushing 38, and a gear 40 positioned below the drive wheel 36 and mounted for rotation with the shaft 34 by the keyed bushing 38. The rear drive wheel unit 26 includes a fixed shaft 42 which is rotatably mounted in the housing 22, a drive wheel 44 mounted for rotation with the shaft 42 by a keyed bushing 46, and a gear 48 positioned below the drive wheel 44 and mounted for rotation with the shaft 42 by the keyed bushing 46. The front feed wheel unit 28 includes a shaft 50 which is rotatably mounted in the housing 22 by a pair of slidable bearing seats 52, a feed wheel 54 mounted for rotation with the shaft 50 by a keyed bushing 56, and a gear 58 positioned below the feed wheel 54 and mounted for rotation with the shaft 50 by the keyed bushing 56. The rear feed wheel unit 30 includes a shaft 60 which is rotatably mounted in the housing 22 by a pair of slidable bearing seats 62, a feed wheel 64 mounted for rotation with the shaft 60 by a keyed bushing 66, and a gear 68 positioned below the feed wheel 64 and mounted for rotation with the shaft 60 by the keyed bushing 66. The transfer wheel unit 32 includes a fixed shaft 70 which is rotatably mounted in the housing 22, an idler wheel 72 mounted for rotation with the shaft 70 by a keyed bushing 74, and a gear 76 positioned below the idler wheel 72 and mounted for rotation with the shaft 70 by the keyed bushing 74.

The front drive wheel unit 24 is positioned adjacent to the front feed wheel unit 28 such that the gear 40 meshes with the gear 58. The rear drive wheel unit 26 is positioned adjacent to the rear feed wheel unit 30 such that the gear 48 meshes with the gear 68. The gears 40, 48 mesh with the gear 76 of the transfer wheel unit 32. By this gearing arrangement, the front and rear drive wheel units 24, 26 are rotated in one direction, while the front and rear feed wheel units 28, 30 are rotated in an opposite direction.

A stepping motor 78 having an output shaft 80 is mounted on top of the housing 22 (see FIGS. 1 and 2). The output shaft 80 of the stepping motor 78 is attached to the shaft 34 of the front drive wheel unit 24 by a flexible coupling 82. The output shaft 80 is designed for clockwise rotation so that the front and rear drive wheel units 24, 26 rotate in a clockwise direction while the front and rear feed wheel units 28, 30 rotate in a counterclockwise direction.

The front feed wheel 54 is provided with an upper circumferential groove 84 and a lower circumferential groove 86. The upper circumferential groove 84 has a radius which is approximately the same as the radius of an upper brazing alloy wire 88, while the lower circumferential groove 86 has a radius which is greater than the radius of a lower brazing alloy wire 90. The front drive wheel 36 has a circumferential surface 92 which is knurled so as to grip and pull the upper brazing alloy wire 88 guided by the upper circumferential groove 84 in the front feed wheel 54. The circumferential surface 92 of the front drive wheel 36 also includes a circumferential groove 94 having a radius which is greater than the radius of the lower brazing alloy wire 90. The circumferential groove 94 cooperates with the lower circumferential groove 86 in the front feed wheel 54 to form a passageway for the lower brazing alloy wire 90.

The rear feed wheel 64 is provided with an upper circumferential groove 96 and a lower circumferential groove 98. The lower circumferential groove 98 has a radius which is approximately the same as the radius of the lower brazing alloy wire 90, while the upper circumferential groove 96 has a radius which is greater than the radius of the upper brazing alloy wire 88. The rear drive wheel 44 has a circumferential surface 100 which is knurled so as to grip and pull the lower brazing alloy wire 90 guided by the lower circumferential groove 98 in the rear feed wheel 64. The circumferential surface 100 of the rear drive wheel 44 also includes a circumferential groove 102 having a radius which is greater than the radius of the upper brazing alloy wire 88. The circumferential groove 102 cooperates with the upper circumferential groove 96 in the rear feed wheel 64 to form a passageway for the upper brazing alloy wire 88.

The housing 22 also includes two pairs of compression springs 104, 106 (see FIG. 5). The springs 104 urge the front feed wheel unit 28 toward the front drive wheel unit 24 to ensure the positive gripping and pulling of the upper brazing alloy wire 88 by the knurled circumferential surface 92 of the front drive wheel 36. The springs 106 urge the rear feed wheel unit 30 toward the rear drive wheel unit 26 to ensure the positive gripping and pulling of the lower brazing alloy wire 90 by the knurled circumferential surface 100 of the rear drive wheel 44.

A wire guide 108 is positioned in the housing 22 between the front drive and feed wheel units 24, 28 and the rear drive and feed wheel units 26, 30. During the initial feeding of the upper and lower brazing alloy wires 88, 90, two holes 110, 112 (see FIG. 5) in the wire guide 108 receive the upper and lower brazing alloy wires 88, 90, respectively, from the rear drive and feed wheel units 26, 30 and guide them beween the front drive and feed wheel units 24, 28.

Referring now to FIG. 2, a feed tube 114 extends outwardly from the front of the housing 22. The feed tube 114 has two large channels 116, 118 which loosely receive and guide the upper and lower brazing alloy wires 88, 90, respectively, to a nozzle 120 located at the end of the feed tube 114. The nozzle 120 is provided with two small channels 122, 124 which tightly but freely receive the brazing alloy wires 88, 90, respectively, from the large channels 116, 118, respectively. The distance between the small channels 122, 124 in the nozzle 120 is dependent upon the construction of the armature wires and the commutator to be brazed. By removably attaching the nozzle 120 to the feed tube 114, the nozzle 120 may be removed and replaced by another nozzle having channels with a different spacing which corresponds to a different armature wire and commutator construction.

Referring generally to FIGS. 1 and 2, the wire feed assembly drive unit 16 includes a slide 126 having a bed 128 which is fixedly attached to a support plate 130 of the support assembly 20 and a carriage 132 which is fixedly attached to the housing 22 of the wire feed assembly 14 and mounted for reciprocating movement on the bed 128. The wire feed assembly drive unit 16 also includes a compression spring 134 which is interposed between a front mounting block 136 extending downwardly from the carriage 132 of the slide 126 and a rear mounting block 138 extending upwardly from the support plate 130 of the support assembly 20. The compression spring 134 urges the carriage 132 of the slide 126 and, hence, the wire feed assembly 14 from a retracted position shown in FIG. 2 to an extended position (not shown) in order to feed the upper and lower brazing alloy wires 88, 90 which extend outwardly from the nozzle 120 of the feed tube 114.

Figure 3:
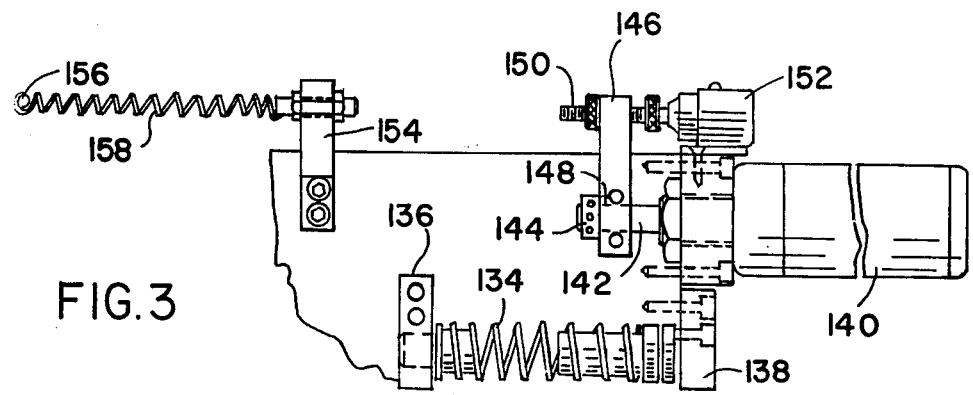
FIG. 3 is a partial cross-sectional view taken along line III—III in FIG. 2 and looking in the direction of the arrows.

With particular reference to FIG. 3, a pneumatic cylinder 140 is also attached to the rear mounting block 138. The pneumatic cylinder 140 includes a reciprocating piston rod 142 having a return nut 144 at its free end. A slide return block 146 extends downwardly from the carriage 132 of the slide 126. The slide return block 146 is provided with a hole 148 through which the piston rod 142 freely extends. A switch actuator 150, which is threadedly and adjustably received in the slide return block 146, is positioned to trigger a microswitch 152 when the wire feed assembly 14 assumes its retracted position. An anchoring block 154 extends upwardly from the support plate 130 of the support assembly 20, while an anchoring post 156 extends downwardly from the carriage 132 of the slide 126. An extension spring 158 is connected between the anchoring block 154 and the anchoring post 156 so as to counteract the compression spring 134.

Referring again to FIG. 2, the wire straightener assembly 18 includes a pair of wire straighteners 160, 162. The wire straightener 160 includes grooved rollers 164 which are arranged so as to gently bend the upper brazing alloy wire 88 as it is fed from its supply roll (not shown). The wire straightener 162 includes grooved rollers 166 which are arranged so as to gently bend the lower bracing alloy wire 90 as it is fed from its supply roll (not shown). The gentle bending of the upper and lower brazing alloy wires 88, 90 as they are fed from their supply rolls actually tends to straighten them. The wire straightener assembly 18 also includes a guide ring 168 through which the upper and lower brazing alloy wires 88, 90 pass before reaching the wire straighteners 160, 162 respectively.

Referring now to FIGS. 1 and 2, in addition to the support plate 130, the support assembly 20 includes a pivot plate 170 which is fixedly attached to the support plate 130 and pivotally attached to a vertical adjustment plate 172 such that the pivot plate 170 can pivot about a horizontal axis. Screws 174 lock the pivot plate 170 at a desired angle selected to permit the lower brazing alloy wire 90 to be properly positioned relative to a joint between the commutator and the lower armature wire. A ratchet 176 and a jack screw 178 cooperate to raise and lower the vertical adjustment plate 172 relative to an angle bracket 180 which is fixedly mounted on the frame member 12 of the brazing machine. By raising and lowering the vertical adjustment plate 172, the height of the wire feed assembly 14 can be adjusted for different size commutators. Screws 182 are provided to lock the vertical adjustment plate 172 in a desired position relative to the angle bracket 180. An adjustable stop 184 is mounted to the support plate 130 in a position to be contacted by the front mounting block 136 of the wire feed assembly drive unit 16. Thus, the stop 184 determines the extended position of the wire feed assembly 14 in a manner to be described more completely hereinafter.

In order to prepare for a feeding operation, the upper and lower brazing alloy wires 88, 90 are loaded into the dual brazing alloy wire feeder 10 by manually feeding them through the guide ring 168 and the wire straighteners 160, 162, respectively. After decompressing the springs 104, 106 and removing the feed tube 114 from the housing 22, the upper and lower brazing alloy wires 88, 90 are fed between the rear drive and feed wheel units 26, 30, through the wire guide 108, between the front drive and feed wheel units 24, 28 and then out of the housing 22. Before reattaching the feed tube 114 to the housing 22 and after removing the nozzle 120 from the feed tube 114, the upper and lower brazing alloy wires 88, 90 are fed manually into the large channels 116, 118, respectively, formed in the feed tube 114. Once the feed tube 114 has been reattached to the housing 22, the upper and lower brazing alloy wires 88, 90 are manually inserted through the small channels 122, 124, respectively, formed in the nozzle 120, which is thereafter reattached to the feed tube 114. After the upper and lower brazing alloy wires 88, 90 have been cut so that they extend outwardly from the nozzle 120 a predetermined distance, the springs 104, 106 are compressed so as to force the upper and lower brazing alloy wires 88, 90 against the knurled circumferential surfaces 92, 100, respectively, of the front and rear drive wheels 36, 44, respectively. The height and angle of the wire feed assembly 14 is then set depending upon the construction of the commutator and armature wires to be brazed. The final preparatory step involves adjusting the distance between the front mounting block 136 and the stop 184 to determine the extended position of the wire feed assembly 14 and, hence, the amount of the upper and lower brazing alloy wires 88, 90 which will be consumed during a single brazing operation.

To initiate an automatic brazing operation, the pneumatic cylinder 140 is actuated to extend the piston rod 142 a distance sufficient to permit the wire feed assembly 14 to be moved to its extended position by the compression spring 134. During the ensuing brazing operation, the extension spring 158 counteracts the compression spring 134 to limit the force exerted on the upper and lower brazing alloy wires 88, 90 by the compression spring 134, thereby inhibiting the bending of the upper and lower brazing alloy wires 88, 90 and the possible splashing of molten alloy during the brazing operation.

The brazing operation continues until enough of the upper and lower brazing alloy wires 88, 90 are consumed so that the mounting plate 136 contacts the stop 184. When the mounting plate 136 contacts the stop 184, an electrical signal is generated which causes the piston rod 142 of the pneumatic cylinder 140 to be automatically retracted, thereby retracting the wire feed assembly 14. When the wire feed assembly 14 reaches its retracted position, the microswitch 152 is actuated by the switch actuator 150. Upon actuation of the microswitch 152, an electrical signal is generated which causes the stepping motor 78 to be automatically actuated to rotate the front and rear drive and feed wheel units 24, 26, 28, 30 long enough to advance a predetermined length of the upper and lower brazing alloy wires 88, 90 in preparation for the next brazing operation. In addition, the microswitch 152 functions as an interlock to control the indexing of the brazing machine in preparation for the next brazing operation. If, for any reason, the microswitch 152 is not actuated, the operation of the dual brazing alloy wire feeder 10 and the brazing machine will be automatically terminated. Thus, the microswitch 152 also functions as a safety device.

It will be understood that the embodiment described herein is merely exemplary and that a person skilled in the art may make many variations and modifications without departing from the spirit and scope of the invention. All such modifications and variations are intended to be included within the scope of the invention as defined in the appended claims.

We claim:

1. A method of brazing a commutator to at least two adjacent armature wires which are arranged one above the other, comprising the steps of automatically feeding a first brazing alloy wire between the commutator and the lowermost armature wire during the brazing of the commutator to the lowermost armature wire; automatically feeding a second brazing alloy wire between the lowermost armature wire and the armature wire directly above it during the brazing of the lowermost armature wire to the armature wire directly above it, said feeding steps being performed simultaneously such that the first and second brazing alloy wires are fed simultaneously; automatically retracting the first brazing alloy wire after the brazing of the commutator to the lowermost armature wire; automatically retracting the second brazing alloy wire after the brazing of the lowermost armature wire to the armature wire directly above, said retracting steps being performed simultaneously such that the first and second brazing alloy wires are retracted simultaneously; automatically advancing a predetermined length of the first brazing alloy wire after the retraction of the first brazing alloy wire; and automatically advancing a predetermined length of the second brazing alloy wire after the retraction of the second brazing alloy wire, said advancing steps being performed simultaneously such that the first and second brazing alloy wires are advanced simultaneously, whereby the first and second brazing alloy wires are ready for feeding in connection with the subsequent brazing of the commutator to at least two other armature wires which are arranged one above the other.

2. A method according to claim 1, wherein the first brazing alloy wire is resiliently and continuously urged between the commutator and the lowermost armature wire during the feeding of the first brazing alloy wire and the second brazing alloy wire is resiliently and continuously urged between the lowermost armature wire and the armature wire directly above it during the feeding of the second brazing alloy wire.

3. A method according to claim 1, further comprising the steps of automatically initiating and terminating the feeding of the first and second brazing alloy wires.

4. A method according to claim 3, wherein the feeding of the first and second brazing alloy wires is automatically initiated and terminated by a piston rod of a pneumatic cylinder.

5. A method according to claim 4, further comprising the steps of extending the piston rod of the pneumatic cylinder to permit the feeding of the first and second brazing alloy wires and retracting the piston rod of the pneumatic cylinder to prevent the feeding of the first and second brazing alloy wires.

6. A method according to claim 1, wherein the first and second brazing alloy wires are fed downwardly at a predetermined angle relative to the horizontal.

7. A method according to claim 1, wherein the first brazing alloy wire is advanced by a first set of rollers and the second brazing alloy wire is advanced by a second set of rollers.

8. A method according to claim 7, wherein the first brazing alloy wire passes freely through the second set of rollers as it is advanced by the first set of rollers and the second brazing alloy wire passes freely through the first set of rollers as it is advanced by the second set of rollers.

9. A method according to claim 1 or 8, wherein the first and second brazing alloy wires are fed one above the other.

10. Apparatus for brazing a commutator to at least two adjacent armature wires which are arranged one above the other, comprising first feeding means for automatically feeding a first brazing alloy wire between the commutator and the lowermost armature wire during the brazing of the commutator to the lowermost armature wire; second feeding means for automatically feeding a second brazing alloy wire between the lowermost armature wire and the armature wire directly above it during the brazing of the lowermost armature wire to the armature wire directly above it, said first and second feeding means being coordinated such that the first and second brazing alloy wires are fed simultaneously; first retracting means for automatically retracting the first brazing alloy wire after the brazing of the commutator to the lowermost armature wire; second retracting means for automatically retracting the second brazing alloy wire after the brazing of the lowermost armature wire to the armature wire directly above it, said first and second retracting means being coordinated such that the first and second brazing alloy wires are retracted simultaneously; first advancing means for automatically advancing a predetermined length of the first brazing alloy wire after the retraction of the first brazing alloy wire; and second advancing means for automatically advancing a predetermined length of the second brazing alloy wire after the retraction of the second brazing alloy wire, said first and second advancing means being coordinated such that the first and second brazing alloy wires are advanced simultaneously, whereby the first and second brazing alloy wires are ready for feeding in connection with the subsequent brazing of the commutator to at least two other armature wires which are arranged one above the other.

11. Apparatus according to claim 10, wherein said first and second feeding means include urging means for resiliently and continuously urging the first brazing alloy wire between the commutator and the lowermost armature wire and for resiliently and continuously urging the second brazing alloy wire between the lowermost armature wire and the armature wire directly above it.

12. Apparatus according to claim 11, wherein said urging means includes a compression spring which feeds the first and second brazing alloy wires in response to the expansion thereof and an expression spring which counteracts the compression spring during the feeding of the first and second brazing alloy wires.

13. Apparatus according to claim 10, further comprising controlling means for automatically controlling the initiation and termination of the feeding of the first and second brazing alloy wires.

14. Apparatus according to claim 13, wherein said controlling means includes a pneumatic cylinder having a piston rod which reciprocates between a retracted position in which said piston rod prevents the expansion of said compression spring and an extended position in which the piston rod permits the expansion of said compression spring.

15. Apparatus according to claim 10, further comprising adjusting means for adjusting the angle at which the first and second brazing alloy wires are fed, whereby the first and second brazing alloy wires may be fed downwardly at a predetermined angle relative to the horizontal.

16. Apparatus according to claim 10, wherein said first advancing means includes a first set of rollers and said second advancing means includes a second set of rollers.

17. Apparatus according to claim 16, wherein said first set of rollers includes a first passageway through which the second brazing alloy wire passes as it is advanced by said second set of rollers and said second set of rollers includes a second passageway through which the first brazing alloy wire passes as it is advanced by said first set of rollers.

18. Apparatus according to claim 10 or 17, wherein the first and second brazing alloy wires are fed one above the other.

* * * * *

UNITED STATES PATENT AND TRADEMARK OFFICE
CERTIFICATE OF CORRECTION

PATENT NO. : 4,471,202

DATED : September 11, 1984

INVENTOR(S) : RIORDAN, ET AL.

It is certified that error appears in the above-identified patent and that said Letters Patent are hereby corrected as shown below:

Column 7, line 3, after "above" insert --it--; and

Column 8, line 32, delete "expression" and insert --expansion--.

Signed and Sealed this

Twelfth Day of March 1985

[SEAL]

Attest:

DONALD J. QUIGG

Attesting Officer          Acting Commissioner of Patents and Trademarks